US011227458B1

(12) United States Patent
Farah et al.

(10) Patent No.: US 11,227,458 B1
(45) Date of Patent: Jan. 18, 2022

(54) OCCUPANCY ANALYSIS SYSTEM USING DEPTH SENSING TO DETERMINE THE MOVEMENT OF PEOPLE OR OBJECTS

(71) Applicant: Density Inc., San Francisco, CA (US)

(72) Inventors: Andrew Farah, San Francisco, CA (US); Casey Kelso, Bellingham, WA (US); Brian Weinreich, New York, NY (US); Benjamin Redfield, New York, NY (US); Garrett Bastable, San Francisco, CA (US); Matthew Merati, New York, NY (US); Siu Kwong Mok, Bellevue, WA (US)

(73) Assignee: Density Inc., San Francisco, CA (US)

( * ) Notice: Subject to any disclaimer, the term of this patent is extended or adjusted under 35 U.S.C. 154(b) by 0 days.

(21) Appl. No.: 16/844,749

(22) Filed: Apr. 9, 2020

Related U.S. Application Data

(60) Provisional application No. 62/832,794, filed on Apr. 11, 2019.

(51) Int. Cl.
| | |
|---|---|
| *G06K 5/00* | (2006.01) |
| *G07C 9/28* | (2020.01) |
| *G06K 9/00* | (2006.01) |
| *G01S 7/48* | (2006.01) |
| *G06K 7/10* | (2006.01) |
| *G01S 17/04* | (2020.01) |

(52) U.S. Cl.
CPC .............. *G07C 9/28* (2020.01); *G01S 7/4802* (2013.01); *G01S 17/04* (2020.01); *G06K 7/10366* (2013.01); *G06K 9/00342* (2013.01); *G06K 9/00778* (2013.01)

(58) Field of Classification Search
CPC ......... G07C 9/28; G01S 17/04; G01S 7/4802; G06K 7/10366
USPC .......................................................... 235/380
See application file for complete search history.

(56) References Cited

U.S. PATENT DOCUMENTS

| | | | |
|---|---|---|---|
| 10,021,530 B2 * | 7/2018 | Sigal ....................... H04W 4/33 |
| 2011/0157366 A1 * | 6/2011 | Padmanabh ......... G08B 13/196 |
| | | | 348/159 |
| 2013/0107245 A1 * | 5/2013 | Covaro .................... G07C 1/00 |
| | | | 356/51 |
| 2019/0080573 A1 * | 3/2019 | Mieko ................... G01J 5/0806 |

(Continued)

*Primary Examiner* — Ahshik Kim
(74) *Attorney, Agent, or Firm* — Maynard Cooper & Gale, P.C.; Jon E. Holland, Esq.

(57) ABSTRACT

A depth sensing device, situated above a threshold to a room, collects asynchronous, non-personally-identifiable data regarding a count of people entering and exiting across the threshold. Phase shift of modulated infrared light reflected from a light source to an object is measured and converted into depth data indicating the depth of the pixels therein. The depth data is used to classify detected objects as human, and to track their movement bi-directionally through the threshold. A running count of humans entering or exiting the room is streamed to a remote server, which aggregates data collected from a number of depth sensing devices. The server then makes that data available at various levels of visualization corresponding to different levels of a hierarchy of nested virtual spaces, such as a multi-entrance room, or a building. Entities that access this data may see a real-time, accurate count of humans currently occupying the virtual space, as well as historical data.

19 Claims, 10 Drawing Sheets

(56) References Cited

U.S. PATENT DOCUMENTS

2019/0353824 A1\* 11/2019 Bloem ..................... G01V 8/10
2020/0226363 A1\* 7/2020 Holliday ................ G06K 9/627

\* cited by examiner ent parts of a depth
OCCUPANCY ANALYSIS SYSTEM USING DEPTH SENSING TO DETERMINE THE MOVEMENT OF PEOPLE OR OBJECTS

RELATED APPLICATIONS

This application claims priority to U.S. Provisional Application No. 62/832,794, entitled "OCCUPANCY ANALYSIS SYSTEM USING DEPTH SENSING TO DETERMINE THE MOVEMENT OF PEOPLE OR OBJECTS" and filed on Apr. 11, 2019, which is incorporated herein by reference.

BACKGROUND

In modern society, large amounts of data are constantly being collected, revealing patterns and trends about human behavior that can be invaluable to businesses. Brick and mortar establishments (for instance, businesses) may have an interest in knowing the number of people that pass through their doors. Such data may be helpful in understanding their normal flow of business, identifying busier and quieter times, and evaluating the success of promotions or events, among many other things. Customers may also wish to know how busy a place is at a particular time, to predict their own wait time and avoid periods of high congestion without having to physically visit the space to observe its occupancy. However, as the amount and accuracy of collected data increases, so too does society's desire for privacy and security of personally-identifiable information. Therefore, an establishment's and its customers' desire for accurate people count data conflicts with the wish to avoid overly invasive forms of surveillance.

Existing people counting solutions are insufficient to address this conflict. Human-performed, manual solutions, such as observational studies or tally-counting (with a clicker) require a dedicated human observer, cannot be performed at all times, and may be prone to error. Therefore, those solutions lack accuracy and scalability. Solutions implemented through other types of existing technology are similarly inadequate. While increased accuracy of counting can be obtained through, e.g., the use of optical cameras or badge/fob data (typically RFID), such methods of data collection create or rely upon repositories of personally-identifiable information, thereby sacrificing anonymity. Some technical solutions may offer increased privacy, through the use of, e.g., thermal cameras, motion sensors (passive infrared), break beam sensors, and the like, but once again sacrifice accuracy of results. For example, those existing anonymous solutions may have limited range of detection or may be unable to classify or identify objects as human (as compared to, e.g., animals or inorganic objects), leading to false positives. In some cases, these solutions may suffer from problems relating to depth of field, occlusion, and/or stereoscopic vision. Solutions implemented by third-party proxies, such as the aggregation of point-of-sale data, energy consumption tracking, or Wi-Fi MAC address tracking may be insufficiently imprecise, as they track only data tangential to people count and may also collect personally-identifiable information (device data). Further, solutions such as Wi-Fi MAC address tracking may be rendered inaccurate by MAC address randomization or other privacy protecting efforts used by device vendors.

Therefore, additional solutions to provide anonymous, accurate, real-time people counting are generally desired.

BRIEF DESCRIPTION OF THE DRAWINGS

The above and other features of the present disclosure, its nature and various advantages will be more apparent upon consideration of the following detailed description, taken in conjunction with the accompanying drawings in which.

The use of the same reference numbers in different figures indicates similar or identical items or features. Moreover, multiple instances of the same part are designated by a common prefix separated from the instance number by a dash. The drawings are not to scale.

DETAILED DESCRIPTION

Figure 1A:
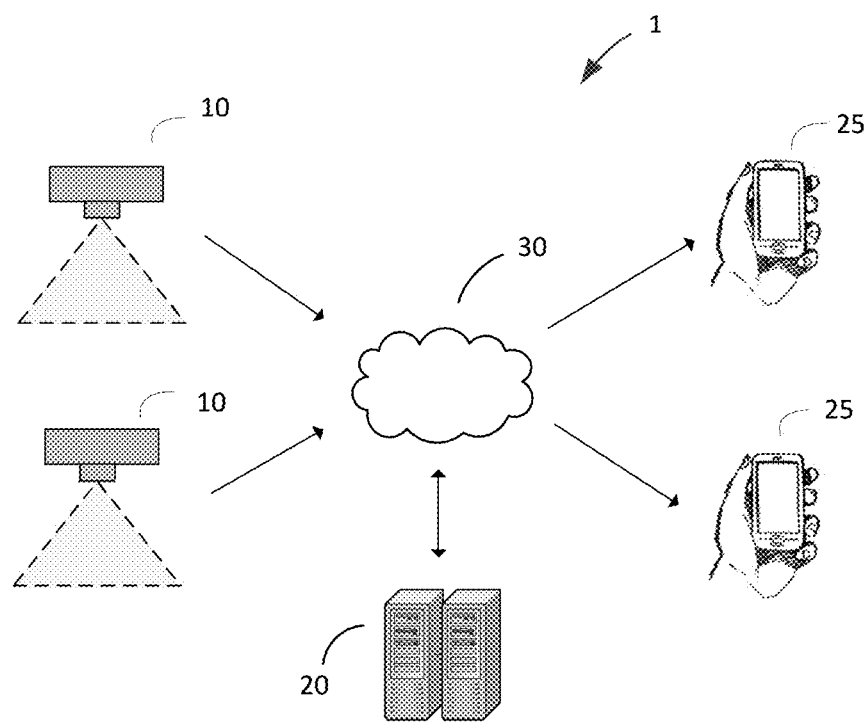
FIG. 1A is a block diagram of an environment in which a depth sensing device can be used in accordance with some embodiments of the present disclosure.

A depth sensing device may be used to recognize the movement of objects through a doorway or within an open space. In one embodiment, a device positioned above a threshold to a doorway of a room generates privacy-friendly depth data from which people count data can be calculated. The device includes a depth sensor that identifies a phase shift of modulated light reflected from a light source to an object. This sensed data is used to generate a string of phase data, corresponding to events showing an object's movement, such as when an object crosses the threshold. A compute module may convert phase data to depth data, which is then analyzed for classification purposes. Shapes in the depth data may be classified as one or more human subjects, while retaining anonymity of the subjects' identity. In other embodiments, rather than a depth sensing device, another type of sensor or camera can be used (e.g., a thermal camera, an RGB camera, a motion sensor, a break bream camera, or the like), in which case the compute module may limit, filter, or otherwise process the sensed data to anonymize any sensed subjects within the data.

The movement of the human subjects through the doorway is detected (that is, the threshold of the doorway can be measured, monitored, scanned, or otherwise actively evaluated or analyzed) for the purpose of determining whether they moved into and/or out of a space. In real time, a person's direction of travel is labeled as an ingress or egress into the measured space, and a sequence of count data (+1/−1) corresponding to the sequence of entry/exit events is generated, a concept referred to herein as people counting. In one embodiment, the device uses an on board machine learning algorithm to classify objects and identify people within the depth data, with all processing handled locally and no depth data being stored or transmitted. In one embodiment, the algorithm outputs a sequence of count data to a remote server (viz., the cloud). In other embodiments, rather than a cloud-based server or the Internet, this sequence of count data is sent via one or more internal or restricted networks (e.g., an intranet) to a local machine or share (whether dedicated to the processing of the binary data or not). Typically, the count data is accompanied by information sufficient to uniquely identify the device, such as a device name or ID, a network ID, a MAC address, or the like. This identifier may be sent in association with each count in the sequence, or in association with the sequence as a whole. In some embodiments, the data output by the device may include timestamp data indicating a time of ingress or egress for each count in the sequence (or for the sequence as a whole). The cloud-based server (or, in alternate embodiments, the local machine or share) may then analyze the sequenced data to develop occupancy metrics reflecting a total people count within a particular space bounded by the measured doorways. The occupancy metrics are made available for inspection through an API. Data from several devices, positioned at different locations (e.g., over different doorways) may be aggregated together to determine an accurate people count within the area(s) accessible through the measured doorways. In this regard, a multi-door setup to a room can be considered in its totality, through the compilation of information from multiple depth sensing devices.

In one embodiment, the occupancy data is processed in the cloud so as to be analyzed at various granularities of physical and logical space. These may be understood as virtual spaces that exist within a hierarchy of perception, such that count(s) of people may be tracked within a nested set of geographic spaces, such as a room, a floor, a building, or a campus, and/or logical spaces, such as an organizational grouping (e.g. a department or set of people) or a non-contiguous subset of rooms or geographic spaces. In one embodiment, the count data is distributed to one more users via an API so as to be accessible from a mobile or other computing device, and may be filtered upon or otherwise manipulated at the level of different virtual spaces.

In another embodiment, in addition to phase data, the depth sensing device may collect and transmit data about the health or status of the device. In some embodiments, the device may also collect external ambient data. For example, the device may include an accelerometer that tracks vibrations (such as door slams) even where no visual effect can be seen. In another embodiment, the device may include an ambient light sensor to track lighting within or of the space. The various collected information may be provided to an external server for analysis.

In another embodiment, multiple devices may be positioned over one doorway that is too large to be monitored by a single device. Each device positioned over the doorway may be arranged so as to monitor a space that partially overlaps with the space monitored by an adjacently positioned (or adjacently monitoring) device. The cloud-based server, when receiving depth data from both adjacent devices monitoring the same doorway, may additionally receive timestamp data and/or XY coordinate data, and may analyze that data to determine duplicative count data collected from the overlapping space(s) and may adjust a total aggregate count for the room to account for any duplication.

FIG. 1A depicts an illustrative block diagram of an environment 1 with a people counting system in accordance with some embodiments. As illustrated, a people counting system includes a plurality of depth sensing devices 10, each monitoring a separate physical space, one or more remote servers 20, a network 30, and one or more mobile devices (such as a mobile phone or iPad) or alternate computing devices (such as a mobile device or PC) 25. Network 30 may comprise one or more network types, e.g., a wide area network (such as the Internet), a local area network (such as an intranet), a cellular network or another type of wireless network, such as Wi-Fi, Bluetooth, Bluetooth Low Energy, and/or other close-range wireless communications, a wired network, such as fiber optics and Ethernet, or any other such network or any combination thereof. In some embodiments, the network 30 may be the Internet and information may be communicated between system components in an encrypted format via a transport layer security (TLS) or secure socket layer (SSL) protocol. In addition, when the network 130 is the Internet, the components of the environment 1 may use the transmission control protocol/Internet protocol (TCP/IP) for communication. In an exemplary embodiment, remote server 20 may include one or more servers operated and managed by a single entity, however, in other embodiments, processing may be distributed between multiple entities at different geographic locations. In still other embodiments, remote server 20 need not actually be physically or logically "remote" to the depth sensing devices 10, and the processing may instead be performed at a server or share (whether dedicated or not) connected by a local area network.

In an exemplary embodiment, the components of the people counting system facilitate the collection of event data based on a phase shift of modulated light reflected from a light source to an object in a depth sensing device, the translation of that phase data first to depth data and then to anonymous people count data, and the aggregation and reconciliation of the count data at the remote server. The components of the people counting system may also facilitate the access and display of the aggregated count data by mobile device 25.

Figure 1B:
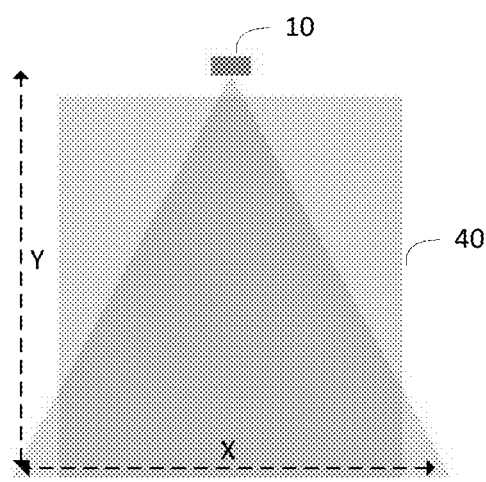
FIG. 1B depicts the placement of a depth sensing device in accordance with some embodiments of the present disclosure.

FIG. 1B is a diagram showing the placement of an exemplary depth sensing device 10. Device 10 is typically configured for indoor installation, however, in alternate implementations, the device may be used in outdoor or partially outdoor conditions (e.g., over a gate or open air tent). In general, however, the device 10 may be understood to be situated over a defined doorway or other type of threshold in spaces such as rooms, offices, cafes, bars, restaurants, bathrooms, retail entrances, book stores, fitness centers, libraries, museums, and churches, among many other types of facilities. The positioning of the device 10 may be selected to balance the need for a sufficiently large field of view while still maintaining anonymity of any subjects or objects sensed within the monitored area. In an exemplary embodiment, the device 10 is positioned directly above a doorway and aimed straight down (or relatively straight down) into the threshold of the doorway rather than into an open area in front of the doorway or the space beyond it. Through these means, it is less likely that any personally identifiable information (such as facial features) will be captured, or that a person may be tracked within a larger space. The particular positioning of the device 10 in a doorway 40 may rely upon, e.g., a desired lens and field of view, and such positioning is discussed below in greater detail. As illustrated in FIG. 1B, device 10 is situated so as to have a field of view with a maximum width X and a maximum length Y. In other embodiments, rather than a doorway, one or more devices 10 may be arranged from the ceiling (or another elevated point) within an open space to track the entry or exit of people within the bounds of a set physical space. As one example, at a retail space or convention space, a device 10 could be positioned above an area of interest (e.g., where a new product is located) to gauge interest by the number of people who enter the bounded area, though of course many other applications are possible.

Figure 2:
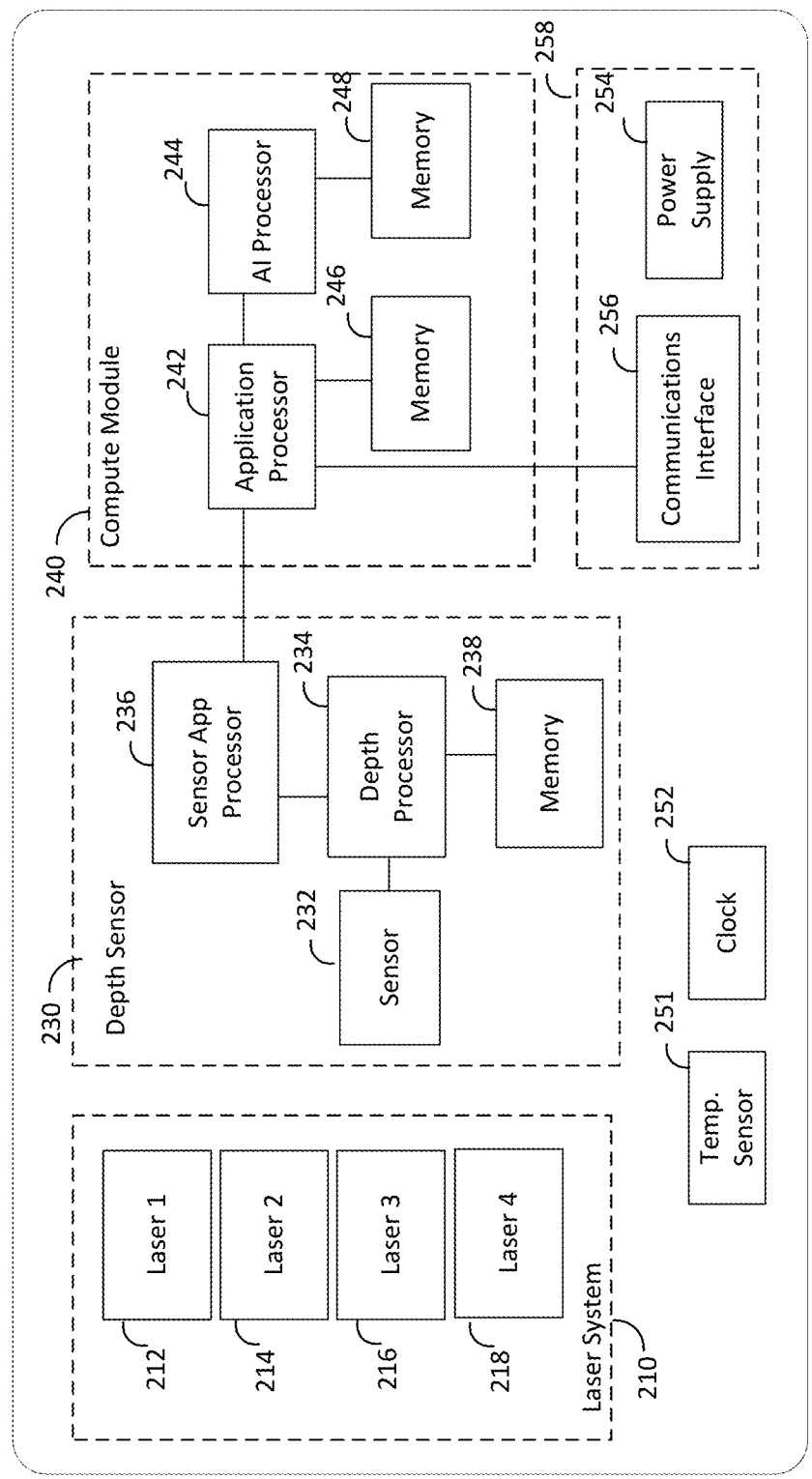
FIG. 2 is a diagram of certain component parts of a depth sensing device in accordance with some embodiments of the present disclosure.

FIG. 2 illustrates an example schematic diagram of components of an exemplary depth sensing device 10. FIG. 2 depicts three modules: a laser system 210, a depth sensor 230, and a compute module 240, the various components of which may be interconnected and may communicate with and/or drive other modules via one or more local interfaces (not shown), which may include at least one communication bus. However, any practical configuration of the illustrated components may be used, and the components need not fall into the particular logical groupings illustrated in FIG. 2. Further, It will be understood that the architectures described below and illustrated in FIGS. 2-6 are not limited to the components discussed herein, and may include other hardware and software components. Rather, for ease of explanation, only the components and functionalities most relevant to the subject systems and methods are discussed herein.

Device 10 includes a number of processors that may execute instructions stored in a corresponding memory to control the device's functionalities. Typically, these processors (depth processor 234, sensor app processor 236, application processor 242, and AI processor 244, described below) may include, for example, one or more of central processing units (CPU), digital signal processors (DSP), graphics processing units (GPU), application-specific integrated circuits (ASICs), field-programmable gate arrays (FPGAs), and/or microprocessors programmed with software or firmware, or other types of circuits for performing the described functionalities (described further herein), or any combination thereof. As used herein, memory may refer to any suitable storage medium such as disks, thumb drives, etc., both volatile and non-volatile. Examples of such media include RAM, ROM, EEPROM, SRAM, flash memory, or any other tangible or non-transitory medium that stores information that is accessible by a processor. Different embodiments may have components with differing capabilities, so long as the amount of RAM is sufficient to support reading sensor data and running analysis algorithms as described herein, and running all necessary supporting software.

FIG. 2 illustrates four lasers, labeled as elements 212-218, which make up an exemplary laser system 210. These lasers are, in an exemplary embodiment, Class 1 eye-safe infrared (IR) lasers that illuminate a monitored area, typically a doorway, though other appropriate light sources may be used in different embodiments. As the infrared light transmitted from the lasers is reflected, the light passes through a lens (not shown in FIG. 2) that focuses the light on device 10's IR depth sensor 232, which may be, in some embodiments, a IR-sensitive CMOS device. Depth sensor 230 also includes a depth processor 234 and a sensor app processor 235 that generate distance measurements from the sensed data and may perform a variety of processing, such as noise reduction. These processing elements may execute instructions stored in, and may variously read/write to, a memory 238, which may include a combination of temporary storage (for sensed data) and permanent storage (for operational software and the like).

Compute module 240 generally handles the processing of phase data generated by the depth sensor 230 from the CMOS sensor data. In addition to the application processor 242, compute module 240 includes an AI processor 244 for analysis and classification of the depth data. The processors 242 and 244 may respectively execute instructions stored in, and read/write to, memories 246 and 248, which may include a combination of temporary storage and permanent storage.

While the terms "depth sensor" and "depth sensing" are used in this disclosure, the devices 10 are not meant to be so limited, and other embodiments may exist where a device 10 uses sensing methods other than depth sensing to determine the movement of objects through a monitored space. For instance, in alternative embodiments, device 10 may have one or more other types of sensors capable of imaging or monitoring the area under a doorway or enclosed space, these sensors being used to in addition to or as an alternate to the laser system and/or depth sensor. By way of example, in some embodiments, device 10 may contain one or more of a thermal camera, an optical (e.g., RGB) camera, a motion sensor, a break beam sensor, and/or any other known type of sensor(s) so long as the sensor(s) are capable of fitting and operating within the device 10. The sensed data from these various sensors may in various embodiments be collected, additionally or alternatively to, the data from the CMOS sensor. The general principles described herein are agnostic to the particular technique used to collect data about the monitored area. While embodiments may exist where device 10 does not collect (or is not limited to collecting) phase data or convert sensed data into depth data, an exemplary device may still be referred to herein as a "depth sensing device" for ease of explanation.

Depth sensing device 10 may additionally include a communication interface 256 with one or more interfaces for wireless communication (e.g., Wi-Fi or Bluetooth antennas) and/or a wired communication interface. In addition, the device may have a power supply 254 providing a physical connection to AC power or DC power (including power conversion circuitry). While FIG. 2 illustrates communication interface 256 and power supply 254 as two separate components, in exemplary embodiments, a single Power Over Ethernet (PoE) system 258 (e.g., PoE 802.3af-2003 or 802.3at-2009, though any appropriate standard may be used) may be used to provide both functions, the PoE system receiving electric power along with data through a physical interface, such as an RJ45 connector or similar. Device 10 is designed to be constantly powered, so as to always be in a ready state to recognize and capture event data, and therefore, the device relies primarily on a continuous power connection (PoE). However, in some embodiments, device 10 may have a battery (not specifically shown) to provide backup power, in the case of a power outage or mechanical failure of the PoE/power supply component. Device 10 may include a USB interface into which a peripheral (e.g., to provide Bluetooth or network connection or other functionality) may be inserted. In addition, the device may include one or more LEDs (not specifically shown) that indicate a power and/or functional status of the device. Communication through the communication interface 256 is managed by the application processor 242

Device 10 may also include a variety of components configured to capture operation and/or telemetry data about the device 10. The device 10 may include one or more temperature sensors 251 capable of sensing an internal temperature and/or an internal humidity measurement of the device to ensure that such conditions are within functional bounds. In addition, the device 10 may include a clock component 252 that may be used to measure a time (timestamp) of data capture and may also be used in the scheduling of operations by the depth processor 234, e.g., reporting, resetting, and/or data capture operations. In an exemplary embodiment, a timestamp of data capture is collected with a high degree of specificity, typically a fraction of a second.

While FIG. 2 illustrates application processor 242 and AI processor 244 as being two separate processing elements, in alternative embodiments, the functionalities of these processors may be implemented within a single processing element or distributed over several components. Similarly, depth processor 234 and sensor app processor 236 may be implemented as separate processors or within one or more processing elements, in any appropriate configuration. Processors 234, 236, 242, and 244 may be respectively implemented by any type of suitable processor and may include hardware, software, memory, and circuitry (or any combination thereof). In one embodiment, these processors may be implemented as two logical parts on a single chip, such as a custom ASIC or field-programmed gate array (FPGA). In one exemplary implementation, depth processor 234 is a time-of-flight (ToF) ASIC, while the remaining processors are implemented as one or more CPUs. In some embodiments, application processor 242 is a High-Level OS processor (e.g., Linux). Other configurations are possible in other embodiments. Depth sensing device 10 may have other types of suitable processor(s) and may include hardware, software, memory, and circuitry (or any combination thereof) as is necessary to perform and control the functions of depth sensing device 10. In some embodiments, depth sensing device 10 may have multiple independent processing units, for example a multi-core processor or other similar component.

Figure 3:
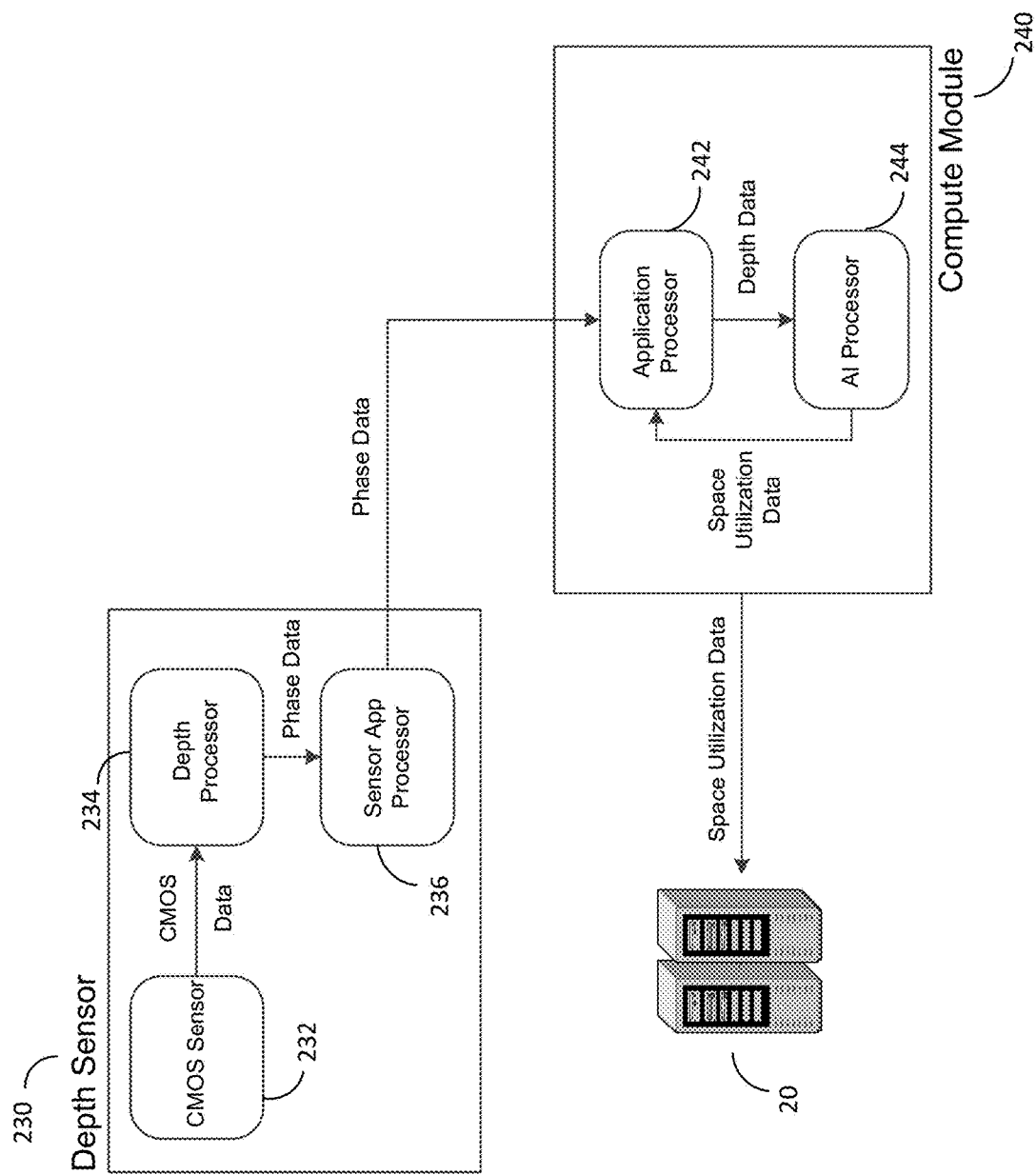
FIG. 3 is a diagram of the flow of data through a system in accordance with some embodiments of the present disclosure.

FIG. 3 illustrates an exemplary flow of data in the device 10 between the sensor 232 and the remote server 20 in accordance with one embodiment. The primary function of device 10 is to accurately count people as they walk through a doorway. This includes the ability to determine directionality of movement, identify multiple people entering simultaneously (and/or in different directions), identify/define thresholds (or trigger lines) that delineate the boundary of passage into or out of the monitored space, and to disregard non-human subjects, including animals, objects, door swings, shadows, and the like. The margin of error in performing these tasks should be relatively low. In some embodiments, the margin of error may be less than 1%.

As described above, a device 10 may be installed over a doorway, with four Class 1 eye-safe infrared (IR) lasers illuminating the doorway area. Typically, the lasers are arranged in a square pattern, however, different embodiments may implement a different number or arrangement of lasers. In one embodiment, the area illuminated includes a roughly 8' by 4' space, though the monitored area may vary in size depending on the placement of the device. A placement of the device 10 over a doorway is often beneficial, as the threshold of a doorway serves as a natural chokepoint for the passage of people or objects. In the exemplary embodiment, device 10 is placed directly above a doorway, facing down, so as to avoid the capture of facial features or other personally-identifiable information. Other placements may be possible in different embodiments so as to capture a greater range of area, but it will be generally understood that as the device 10 is positioned in increasingly open spaces, data capture grows more susceptible to the constraints of occlusion and depth of field issues.

Figure 4A:
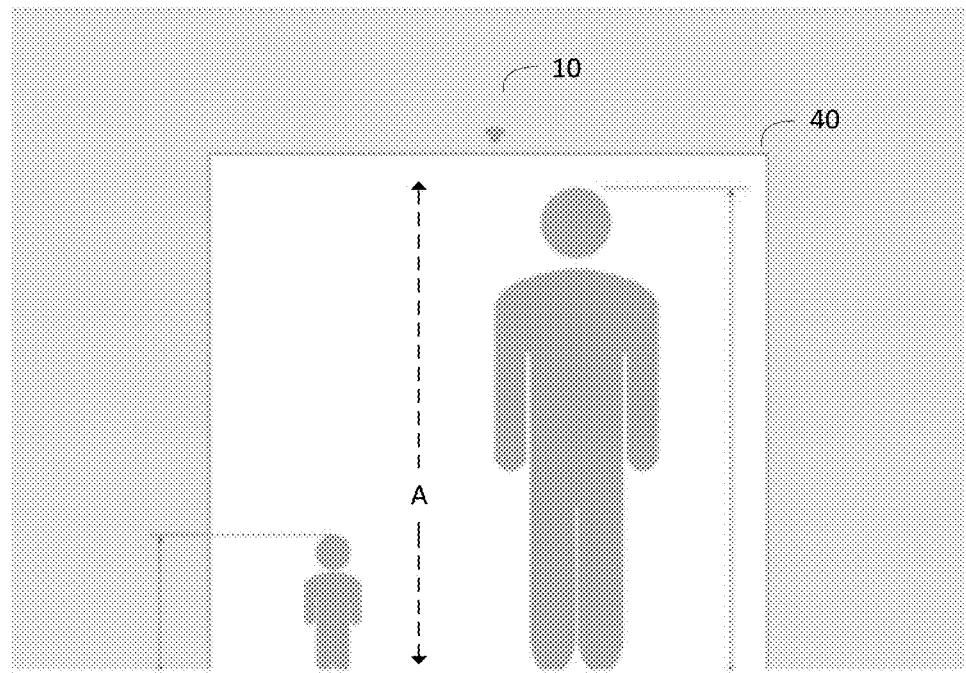
FIGS. 4A, 4B, 4C, 4D, and 4E are diagrams illustrating configuration details of a depth sensing device in accordance with some embodiments of the present disclosure.
Figure 4B:
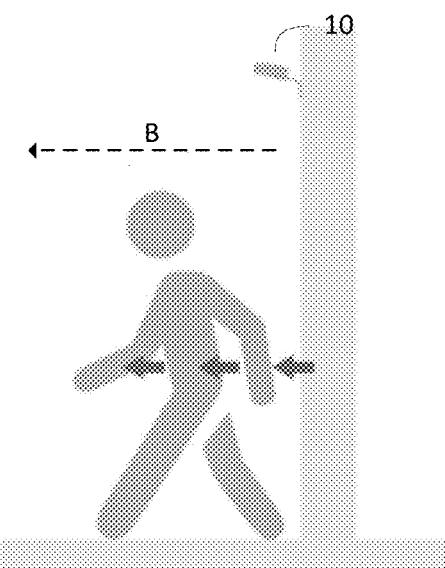

The ability of the device 10 to capture an analyzable scene depends on the lens of the device, the illumination intensity, the angle of placement, and the height and width of the doorway, among other things, all of which factors impact the field of view of the device. An exemplary placement, illustrated in FIG. 4A, is arranged to capture subject (a person) of a height A passing through the doorway 40. The subject may be travelling (walking, or otherwise being conveyed) at a speed B (FIG. 4B). The device may be positioned and configured to capture a person within a supported range of height at a supported range of speed, in a manner where multiple frames (e.g., five frames) of extractable data tracking the subject are captured. By capturing the subject at multiple frames, the change in the subject's position can be tracked (by the computer module 240, described in greater detail below), and from that, it can be determined whether the subject is ingressing or egressing through the doorway.

Figure 4C:
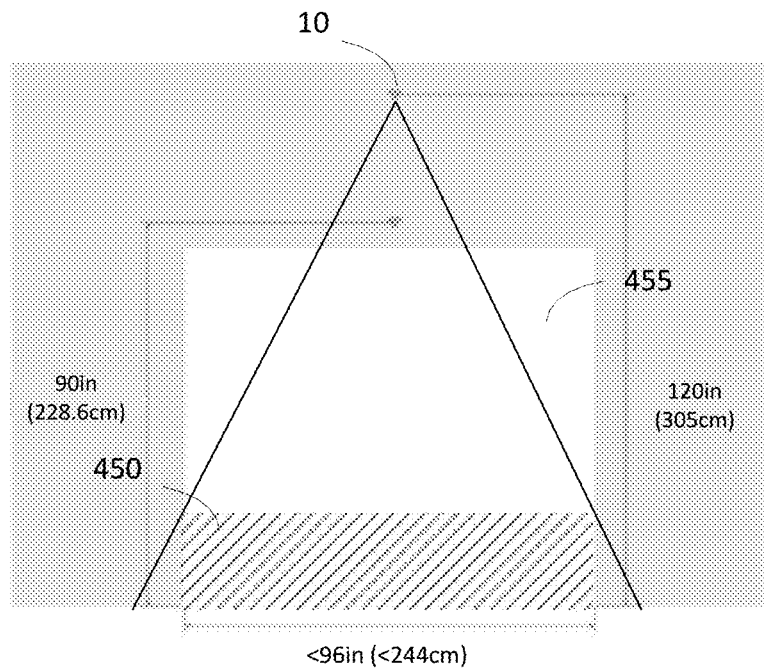
Figure 4D:
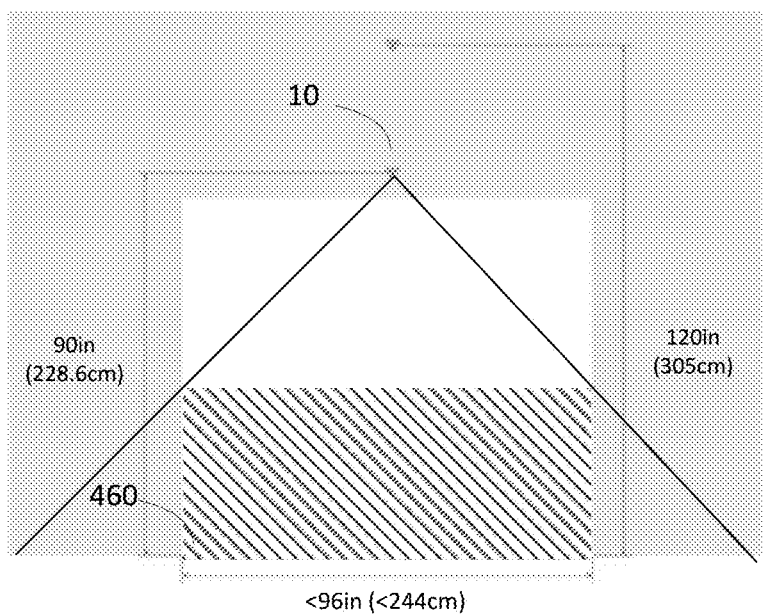
Figure 4E:
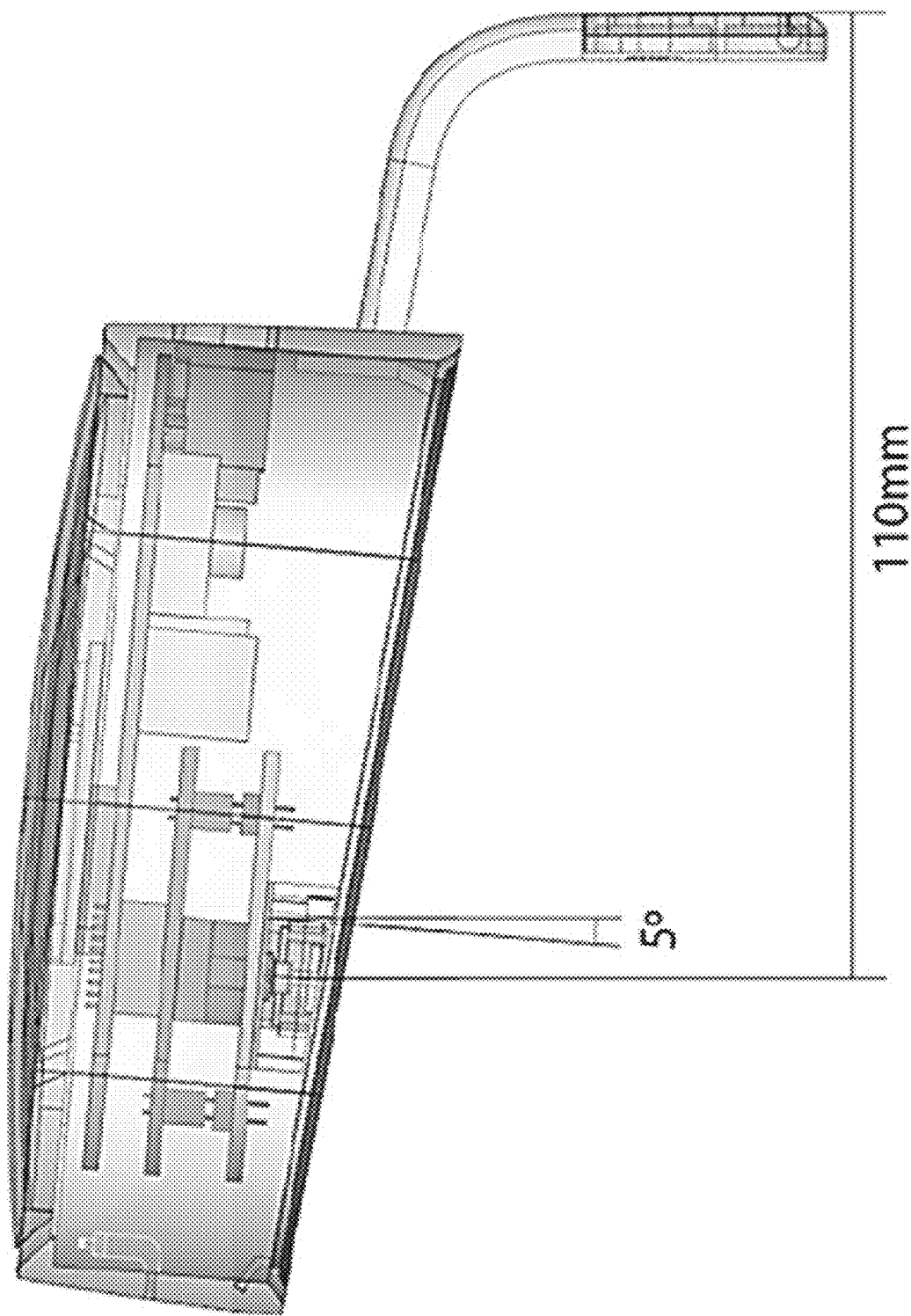
Figure 5A:
FIGS. 5A and 5B depict exemplary data collected by the sensors of a depth sensing device in accordance with some embodiments of the present disclosure.
Figure 5B:
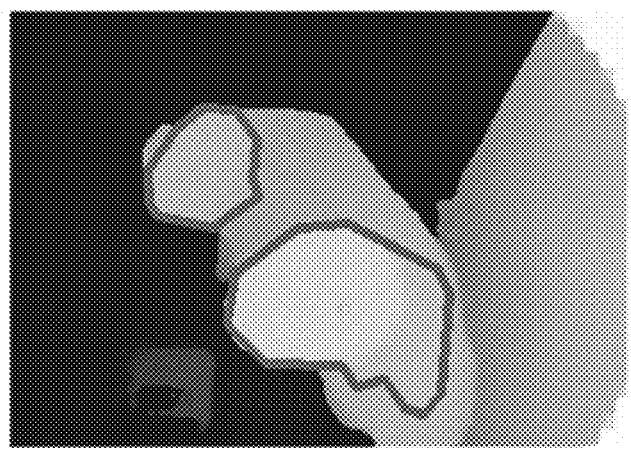
Figure 6:
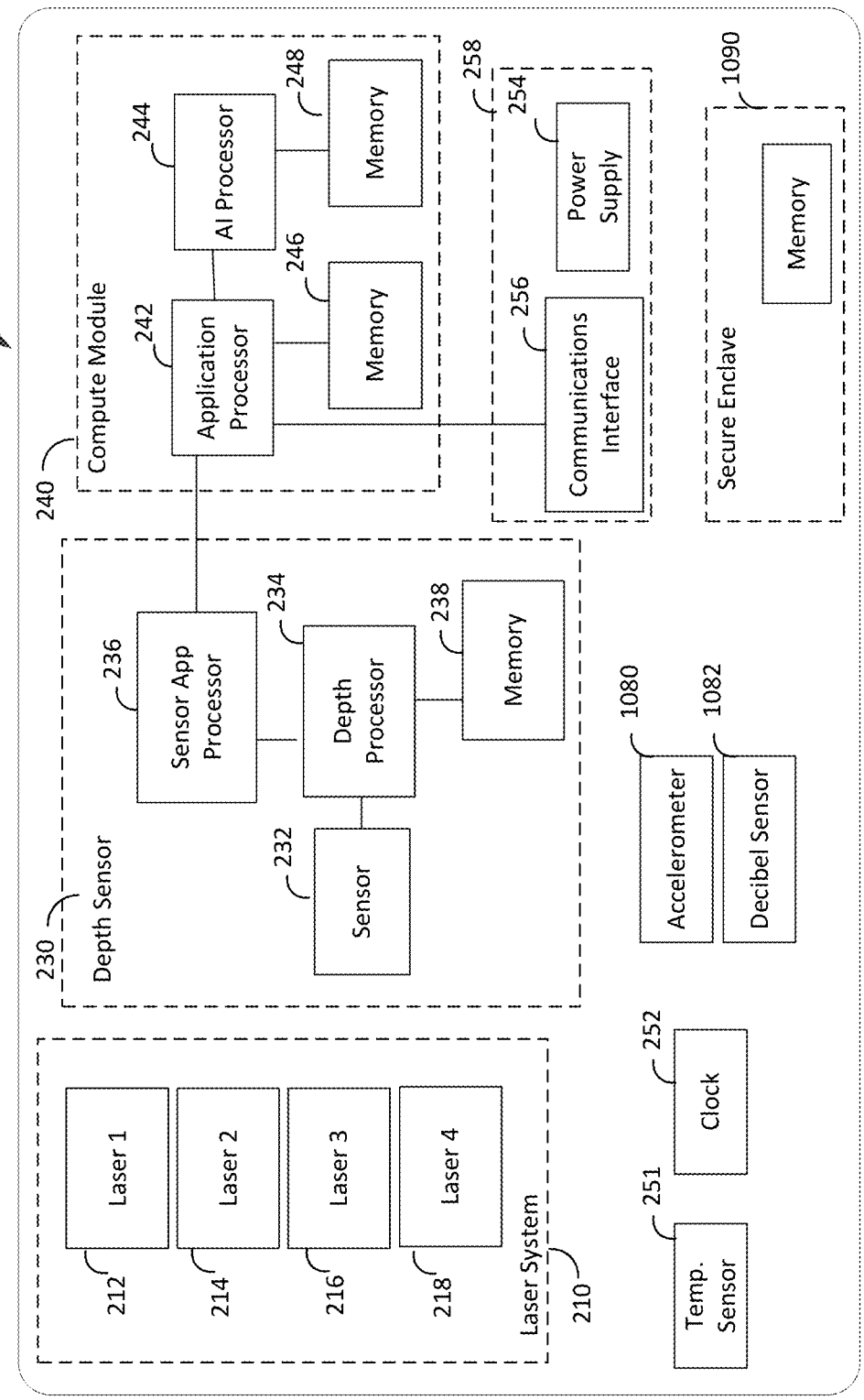
FIG. 6 depicts a block diagram of certain component parts of a depth sensing device in accordance with some embodiments of the present disclosure.

FIGS. 4C and 4D illustrate the effect on the lens of the device 10 on focal length, and specifically, the impact of focal length and lens placement on field of view. To achieve an appropriate field of view, the device is preferably deployed aerially, mounted centered above the doorway at a height of 7 ft-10 ft (2.13 m-3 m) above the floor, although the particular placement may be optimized for the space in different embodiments, or otherwise conformed to environmental needs or limitations. As a general rule, taller/higher installation of the device gives wider coverage (compare hatched area 450 in FIG. 4C to hatched area 460 in FIG. 4D), while a narrowing angle provides better range (compare height of illumination 120" in FIG. 4C to height 90" in FIG. 4D). Device 10 is positioned to achieve an effective analyzable scene, that is, to capture moving subjects, and therefore, the placement must be conscious of areas falling outside of the illuminated field, e.g., outlier area 455 in FIG. 4C, where data is not captured. The illumination intensity may also be adjusted to achieve an analyzable field of view.

As the infrared light transmitted by the lasers is reflected, the light passes through a lens positioned to focus the light on sensor 232. Sensor 232 is, in one embodiment, an IR CMOS sensor. Rather than continuous capture (as a video or timed image capture would do), the event data is captured asynchronously by sensor 232 as events happen, that is, as objects are sensed. The CMOS sensor, in the exemplary embodiment, captures 30 frames/second at a resolution of 320×240, such that when a person or object passes through the threshold of the doorway, they can be observed across multiple frames and movement is tracked across the threshold. Put another way, only "movement data" of the person or object is tracked. While different frame rates and/or resolutions may be used in different embodiments, it will be generally understood that the frame rate should be fast enough to allow tracking of a person or object, rather than a single frame in which their direction of movement cannot be determined.

In some embodiments, both the CMOS sensor and the illuminating lasers are positioned within device 10 at an angle relative to the wall against which the device 10 is mounted, e.g., a 5° angle or a value approximate thereto, though other angles may be used as appropriate. In other embodiments, a board or angling component may be included in a wall mounting component separate to the device. An exemplary embodiment positions the lasers and CMOS sensor at a distance of at least 110 mm from the wall, although other distances are possible in other embodiments. Such angle and positioning, shown in FIG. 4E, avoids oversaturation of the sensor image due to ambient reflection from the wall surface. In this regard, the reflectivity of the ground surface (that is, the material of the ground, e.g., wood, carpet, tile, marble, etc.) may be understood to impact the accuracy of the data capture. Therefore, though an exemplary angle and positioning are described above, the reflectivity of the ground surface or other environmental conditions near the device, may require the adjustment of such angle or position.

The CMOS sensor 232 passes its collected data to depth processor 234. Depth processor 234 uses time-of-flight (ToF) technology to measure, from the collected data, the phase shift of modulated IR light reflected from the light source to the object. This measured phase data will be later transmitted to the compute module 240, which calculates, from the phase shift data, distance measurements across an array of pixels. The process from illumination to the generation of phase data is referred to herein as the data capture, the data capture process resulting from a single frame of data. Scheduling of a data capture, the timing of the illumination and of the sensor activity, is controlled by the depth processor 234. Once the depth processor 234 initiates a data capture and the light is reflected back to the CMOS sensor 232, the depth processor 234 collects the captured data from the sensor, correlates the collected data to the timing of the capture (with reference to clock 252), and calculates the phase data. While, in the exemplary embodiment of FIG. 3, the hardware of the depth processor 234 performs the ToF calculations, other embodiments may offload ToF computation to a dedicated processor or chip (not shown).

Sensor app processor 236 may be, in one embodiment, implemented as a microprocessor. The sensor app processor 236 performs a variety of tasks in support of the depth processor 234 as well as the entire device 10. Initially, the sensor app processor may control power management and firmware/software management (e.g., firmware updates). In addition, the sensor app processor 236 may implement one or more safety checks, for example, to ensure safe operation of the IR illumination package. Still further, sensor app processor 236 may convert the phase data generated by the depth processor 234 so that it may be further processed in the compute module 240. For instance, the time of flight data (phase data) transmitted from the depth processor may be converted from a low-voltage differential signal (LVDS) to a USB signal, and additional processing may be done to, e.g., reduce noise in the data. The sensor app processor 236 may then transmit the converted phase data to the compute module 240 for further processing.

The chipset that includes the depth processor 234 and the sensor app processor 236 functions (among other things) as an image signal processor. The phase data generated by these components is in a condition to be converted to image data, such as that shown in the examples of FIGS. 5A and 5B.

In some embodiments, the sensor app processor 236 may control management of the environmental conditions of the device 10, to ensure that the temperature and power conditions of the device are within the boundaries of acceptable limitations. Temperature sensor(s) 251 may be used to measure ambient and operating temperatures. In an exemplary embodiment, the operating temperatures may range, e.g., from approximately 0° C. to 35° C. (ambient), 0° C. to 60° C. (maximum at enclosure case), 0° C. to 85° C. (internal), and −10° C. to 85° C. (storage), though other ranges may be possible in other embodiments. Similarly, humidity conditions may range, in one embodiment, from approximately 5% to 95% non-condensing and from 20% to 80% non-condensing at minimum.

The phase data is sent by the sensor app processor 236 to the compute module 240, and particularly, to an application processor 242. Compute module 240 may include both application processor 242 and AI processor 244. In general, compute module 240 converts the phase data to depth data, analyzes the depth data to classify identified objects as people (or otherwise), and to process the depth data to capture the movement of those people across a recognized threshold. As people move across the threshold, a person's direction of travel indicates whether the event is an ingress or egress (+1/−1) and the event is classified thusly. Through the identification of this binary ingress/egress data, a sequence of "count data" or "space utilization data" is generated. Typically, each generated count data is a binary value representing an increase or decrease of a total people count in the space, though any type of value can be used so long as that value is sufficient to indicate a positive or negative degree of change. This data retains anonymity of identity, as it is not personally identifiable to any person, and instead, directed merely to their movement into or out of a space.

Application processor 242 receives the phase data of the imaged doorway space from the sensor app processor 236 and converts that data to depth data. The conversion of phase data to depth data may be done through any known calculation. Application processor 242 then sends that generated depth data to the AI processor 244.

The AI processor 244 algorithmically discerns people, and their direction of movement, from other objects in the depth data. In one embodiment, the AI processor uses an on-board machine learning algorithm to classify objects within a frame as human. By combining different clusters of pixels, each with respective heights, AI processor 244 is able to identify the shape of a detected object and can classify these objects as people. In one embodiment, the algorithm implemented by the AI processor may recognize a cluster of pixels as a head, or shoulders. By tracking the movement of that group of pixels within a sequence of frames, the AI processor may track the position of the human subject. In other embodiments, the AI processor may be additionally or alternately capable of identifying other objects, such as animals, objects, furniture or barriers, or other organic and non-organic movement. The AI processor 244 is able to determine when a human is in scene for long periods of time without crossing the threshold into a space, such as a person sitting in a chair within view of the sensor but without forward motion towards the trigger line (described below).

Humans are identified on a per frame basis and are tracked as they move within a space. The AI processor identifies the position of a threshold or a "trigger line" that serves as the boundary of the doorway, i.e., a virtual divider indicating whether a person is within or out of a room. When the identified person passes that trigger line, the AI processor is able to confirm whether the person has entered or exited a space. In some embodiments, the AI processor may discern that the person has passed the trigger line based on the movement of a particular body part (e.g., head), a percentage of their body (e.g., more than x %), or whether the entirety of their body has passed over the trigger line, however, other mechanisms may be used in other embodiments.

Figure 8A:
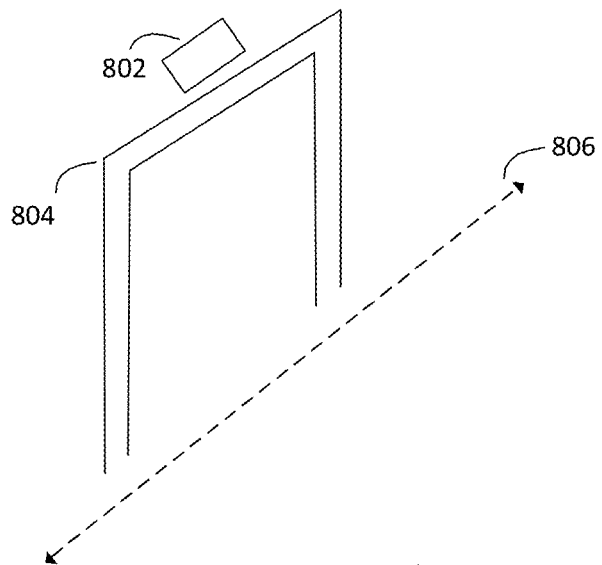
FIG. 8A is a diagram illustrating configuration of a threshold monitored by a depth sensing device in accordance with some embodiments of the present disclosure.
Figure 8B:
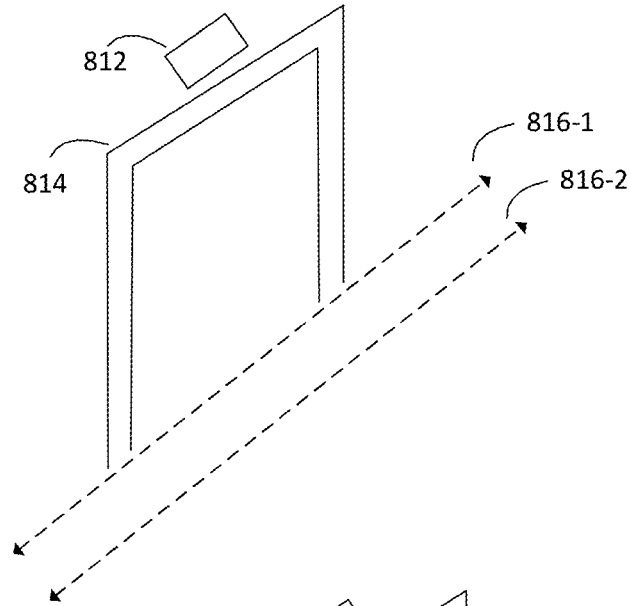
FIG. 8B is a diagram illustrating configuration of a threshold monitored by a depth sensing device in accordance with some embodiments of the present disclosure.
Figure 8C:
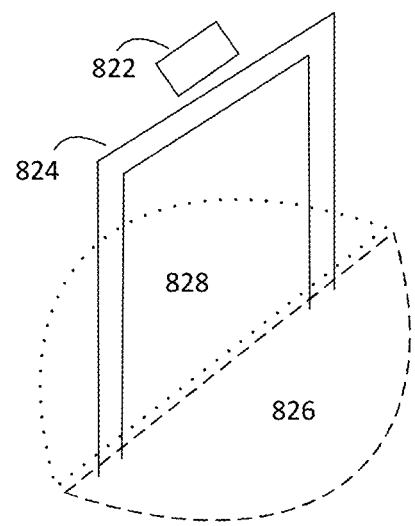
FIG. 8C is a diagram illustrating configuration of a threshold monitored by a depth sensing device in accordance with some embodiments of the present disclosure.

The concept of the trigger line may be further understood with reference to FIGS. 8A through 8C. Each of FIGS. 8A to 8C illustrate a respective doorway 804, 814, 824, each doorway being monitored by a respective device 802, 812, 822 positioned at the same general location relative to the doorway. For ease of explanation, each of the devices 802, 812, 822 contains a sensor app processor 236 along the lines discussed above. In the embodiment of FIG. 8A, a single trigger line 806 (typically a straight line) is used, and the movement of a person across the line 806 reflects a crossing of the doorway threshold. As described above, the direction of the crossing is used to determine whether the compute module 240 should output a +1 or −1 value (for a single person). FIG. 8B illustrates an alternate embodiment, in which the trigger "line" is actually two separate virtual lines 816-1 and 816-2. As illustrated, both lines are positioned on the same side of a doorway, one closer to the doorway than the other, but embodiments may exist where the lines are on opposite sides (e.g., 816-1 positioned on one side of the doorway and 816-2 positioned on the other side). The doorway threshold can be understood, in this embodiment, to reflect the area between and including the lines. Sensor app processor 236 may determine that a person has crossed the threshold where the person has moved across both lines 816-1 and 816-2, and would not determine that the threshold was crossed where a person, for example, crosses only line 816-1 and then changes direction and exits over the same line 816-1. Through this, the sensor app processor 236 may reduce the number of false positives (where a person does not truly cross the threshold). The placement and distance between lines 816-1 and 816-2 may be determined based on environmental factors, such as the size of the doorway and the shape of the room(s) beyond.

Another embodiment may not use a linear threshold demarcation, but instead may use a virtual, non-linear area defining an uncertainty region. In some embodiments, this uncertainty region may be a two-dimensional threshold area, where a person's direction of movement is considered uncertain while the person remains in the threshold area. In some embodiments, the space may be polygonal, and in other embodiments the space may be defined by one or more parabolic, curved, or otherwise irregular boundaries. As shown in FIG. 8C, a doorway 824 monitored by a device 822 may be defined to have a non-linear threshold area 826. While area 826 is shown having parabolic or curved boundary on one side and straight boundary on the other side, such is merely exemplary, and other embodiments may take different shapes, for example polygonal or circular (in some cases surrounding the doorway 824 to extend out on both sides), or combining several non-contiguous areas (as illustrated, area 826 marked with dashed lines and area 828 marked with dotted lines, each on a respective side of the doorway), though other layouts may be possible in other embodiments. It may be generally understood that the shape of the uncertainty region should be configured to the size and shape of the doorway and any environmental conditions related thereto, and to a sufficient size to accurately capture routine, expected, likely, and/or possible movement of people through the monitored area.

In the exemplary embodiment, device 10 (or in some embodiments, remote server 20) contains logic sufficient to configure the size/shape/position of the non-linear threshold space while the device 10 functions to observe objects passing through that threshold space. As in the embodiment of FIG. 8B, a count measurement is only triggered when an object (determined to be a person) is observed to fully pass through the threshold area in either direction, and would not be triggered if a person enters and remains in the threshold area, or enters the area and then changes direction and leaves from the point of ingress without fully passing through the area. As described above, multiple frames of captured data are used to determine the directionality of the object's movement.

The specific size and shape of the non-linear threshold area (for example its length and depth) may differ. In one embodiment, a threshold area may be automatically set based on a size (width) and/or a type of the doorway (e.g., whether it has a hinged, revolving, or sliding door, whether the doorway is automated, etc.). In other embodiments, the size and shape of the threshold area may be determined from a human or machine-led observation of the environment, including characteristics such as area traffic, locality (city/rural), width of available space (e.g., room, corridor, sidewalk), and/or other factors that might suggest that some amount of people may not fully pass through the threshold space (e.g., a lobby or signage, a secured door, or any other relevant circumstances). In some embodiments, a linear threshold may be configured as a default threshold, and where circumstances dictate that greater accuracy may be achieved through a non-linear threshold, a parabolic or otherwise-shaped virtual area may be configured and applied as the threshold.

In some embodiments, the determination of whether to apply a linear threshold or a (non-linear) uncertainty region is made through human observation of the space, for instance during a configuration process. This observation may determine both the need for an uncertainty region and the shape of such a region. In other embodiments, an initial determination of whether to have an uncertainty region as opposed to a straight line(s) is done through a human observation (e.g., through comparison of device-measured ingress/egress with a human-led annotation exercise during a configuration or audit period), while the calculation of the appropriate shape/size/position of the uncertainty region is done in an automated manner, based on e.g., the size of the doorway and type of the doorway, the placement of the doorway relative to other environmental configurations (e.g., the area of capture may be limited or carefully defined where the doorway is off a high traffic hallway) or relative to furniture, walls, objects, or other physical constraints or conditions that restrict and/or guide the flow of traffic. As just one example, the presence of a wall or object immediately to one side of the exit of a doorway may lead a person to turn in one direction after passing through the doorway or during passage (i.e., passing through at an angle/diagonally).

In still other embodiments, the initial determination of whether to use a linear threshold or a non-linear uncertainty region may also be fully or partially automated. To make this determination, an automated system may evaluate a variety of factors or conditions related to the doorway, whether dependent on human observation or machine-determinable. Factors that may be evaluated without human intervention may include, for instance, a number of rapidly-occurring ingress/egress events (a high traffic doorway), ingress/egress data that deviates from expectation based on historical occupancy data for the space, low accuracy of occupancy measurement, repeated false positives or negatives, missed data or blind spots, or conditions suggesting the doorway is otherwise abnormal or non-routine in some way. In an exemplary embodiment, if the number of false positives falls above a certain allowable threshold, then a non-linear region is needed. In still other embodiments, depth sensor 230 may apply different threshold shapes at different, scheduled days/times. For instance, during high-traffic periods, where false positives or negatives may be more likely, a non-linear uncertainty area may be applied, and at lower-traffic times where false positives/negatives are unlikely, a linear threshold can be applied to simplify computation.

Based on the direction of the movement of the person across the threshold (that is, whether they passed so as to ingress or egress from the room), the event of crossing over the threshold is recognized and is assigned a binary +1/−1 value, which acts as count or space utilization data. That is, for each instance that the compute module recognizes that a human has crossed over the threshold of the doorway, a +1 or −1 value is output, based on the direction of crossing. As soon as this determination is made, the AI processor sends this space utilization data to the application processor 242, which in turns outputs the data to the remote server 20. As space utilization data in the form of a +/− value is output for each recognizable event, both the AI processor 244 and the application processor 242 are configured to output a sequence (or stream) of values, each corresponding to a respective single ingress or egress. That is, when the AI processor recognizes, through analysis of a sequence of frames, that two people have passed into a space and one person has exited, the sequence of output data will be +1, +1, and −1. AI processor 244 is configured to distinguish individual people even as they walk through the doorway in groups, therefore multiple +1 or −1 data may be recognized through a single frame. In other embodiments, rather than a sequence of individual events, the count data sent to the remote server 20 may be an aggregated value indicative of a net change to count over a given time period.

In the exemplary embodiment, the identification of humans is performed on top of the generated depth data, and is not based on image classification from an optical camera (e.g., facial recognition), thermal camera, or other similar means. However, in alternative embodiments, data from optical/thermal cameras, RFID, other sensors, and/or other techniques for detecting humans may be considered in addition to, or alternate to, the depth data in the identification of people. In some embodiments, the AI processor 244 improves the depth data before classification, for example by processing the depth data to improve the signal to noise ratio. In other embodiments, these activities may be performed by the application processor 242, or not at all. In some embodiments, the classification of objects is split between the application processor 242 and the AI processor 244. This may be most useful in embodiments where one of the processors is configured to be particularly efficient at a certain type of task. As one example, AI processor 244 may be structured to expediently perform matrix multiplication, while application processor 242 may expediently perform tracking of a shape. The strengths of the relative components of compute module 240 are therefore exploited through distribution of processing to enhance the speed of computation and reduce latency in generating count data. In an exemplary embodiment, the count data is generated and transmitted to the remote server with less than a five second latency from the instance of data capture.

In one alternate embodiment, in addition or as an alternate to laser system 210 and depth sensor 230, the systems and methods described herein could use an RGB CMOS sensor together with infrared (IR) Illumination. In place of multi-frame depth images, a CMOS image sensor system may stream multi-frame RGB images illuminated with ambient light from the sensor app processor 236 to the application processor 242. In an embodiment with a dark or dimly lit environment, the RGB images may be additionally or alternately illuminated by an onboard IR illumination package. Sensor app processor 236 may also perform additional processing to, e.g., reduce noise in the data. Data streamed to the AI processor 244 for classification would be either raw RGB images or stereo images integrated from multiple RGB CMOS sensor sources. While the general functioning and/or requirements of the application processor 242 and the AI processor 244 may be unchanged from those described above, it can be generally understood that the AI processor would implement an AI model (that is, an object recognition model) based on one or more sets of RGB image training data to the image data received from the sensor app processor 236 to generate anonymized count data. In some embodiments, the set(s) of training data may be sent to the device 10 from a remote server as part of a provisioning or configuration (or reconfiguration) process.

In another embodiment, in addition or as an alternate to laser system 210 and depth sensor 230, the systems and methods described herein may use millimeter-wave imaging technologies (mmWave) to collect source data. The data streamed from the sensor to the application processor 242 can take the form of a 3-D point cloud with a time integration component, such that the 3-D point cloud is streamed over time. Unlike a stream of image data, where each captured frame is discretely considered as new (not accounting for video compression algorithms for different frame types, e.g., I-frame or P-frame), the streamed point cloud data is considered cumulatively, with a time constant for integration of data across frames or sub-frames. Data streamed to the AI processor 244 for classification may include a point cloud stream along with Doppler data and/or other signs of life metrics. While the general functioning and/or requirements of the application processor 242 and the AI processor 244 may be unchanged from the embodiments described above, it can be generally understood that the AI processor would implement an AI-model based on one or more sets of point cloud image training data, where the set(s) of training data may be sent to the device 10 from a remote server as part of a provisioning or configuration (or reconfiguration) process. The output of the AI processor 244 may, in one embodiment, be is fused with output from a Bayesian inference engine by a Kahlman filter. In some embodiments, this solution may be implemented via a post-processing firmware implementation on the sensor app processor 236. In one embodiment, this type of mmWave source may be used for active thermal imaging (a thermal camera), that is, to sense temperature differentials between a target object and a background.

In still another embodiment, in addition or as an alternate to laser system 210 and depth sensor 230, the systems and methods described herein may use a passive infrared (PIR) sensor (or other known type of motion detecting sensor) as an auxiliary dataset to provide a confidence filter against captured depth data, mmWave point cloud data, and/or an RGB CMOS sensor stream. The data captured by the PIR sensor is filtered by sensor app processor 236 and is provided as an input to application processor 242 (or AI processor 244), which applies a final stage voting mechanism or Kahlman filter. One use of captured PIR data is to improve a heterogeneous dataset with additional non-overlapping/disjointed sensor data, so as to calculate a confidence level related thereto.

The processing of the count data is implemented locally within the device 10, however, none of the phase data, depth data, telemetry data, or intermediate data created for calculation is stored in any permanent memory on device 10. In normal operation, none of the phase data or depth data is stored on any remote server (although phase data may be stored in instances of, e.g., installation, calibration, troubleshooting, or audit). Rather, the generated phase data and depth data is ephemeral, such that no personally-identifiable data is captured, stored, transmitted, or cached for post-processing. In some embodiments, where there has been a power or network outage, the depth sensor 230 may store some limited amount of data collected by the CMOS sensor in an event data buffer (not specifically shown), so as to be processed in the future without data loss. Where buffer space for the event data has been exceeded, no further data is stored. Neither depth data nor count data is calculated during network outages, and after the outage has passed and the phase data has been processed in its routine manner, all such stored data is deleted so as not to be permanently stored. In an exemplary embodiment, neither the computations performed by the depth processor 234, the application processor 242, or the AI processor 244 use confidence data, however, in an alternate embodiment, confidence data may be maintained in a hardware-specific secure enclave on the chipset (element 1090 in FIG. 6) so as to be securely stored. In this alternate embodiment, if the confidence data (or other securely stored) data must be transmitted, the device 10 encrypts the data for secure transmission.

The count data generated by the AI processor 244 is transmitted to the remote server 20 as a stream of data by the application processor 242 via the communication interface 256 (wired or wireless connection). As described above, in the exemplary embodiment, the count data sent to the server 20 includes a sequence of events (+1/−1). In some embodiments, each event in the sequence of events may be associated with a respective timestamp at which the event occurred (that is, the time of the illumination and data capture). In some embodiments, each event may additionally be associated with a set of XY coordinates, indicating one or more pixel positions at which the counted person was located within a captured image. This event is aggregated in real-time so as to present a current total real-time count of the people that have passed into or out of an area. In a room with a single-entry point, data from one device 10 may be sufficient to provide a total count for the room. In a room with multiple entryways, data from several devices, positioned at different locations (e.g., over different doorways) may aggregated and reconciled. That is, for a multi-door room (with two or more entrances/exits), the server 20 will consolidate information from the two to achieve a single, accurate number of people in the room, regardless of which entrance/exit they use. This aggregation and reconciliation is performed by logic at the remote server 20, with no count data being sent back to any device 10. It is generally noted that while the server 20 is referred to as a "remote" server, the functions of the server 20 need not necessarily be performed on a system physically remote to the device 10. Rather, in alternative embodiments, the functions described herein with regard to the server 20 may be performed locally by one or more devices 10 or by another device within a local network that includes one or more devices 10.

In some embodiments, remote server 20 may contain logic to analyze cloud data at various granularities of space. This concept may be understood as a virtual space—a digital representation of a physical space—with different virtual spaces existing within a hierarchy of perception. To illustrate, a total count of people within any of a number of geographic spaces may be calculated, such as a campus, a building, a floor, a room, or a cubicle, each subsequent space being a subset of the larger physical space before it so as to fit within in. A virtual space may be defined for each of these physical spaces, creating a set of "nested" virtual spaces. A user (such as a business owner) interested in tracking occupancy at any or all of those geographical spaces may then be able to access real-time occupancy data thereof by selecting the corresponding virtual space, after which a total count for the selected space is displayed/transmitted. Similarly, in addition to particular physical spaces, remote server 20 may contain logic to generate aggregated count data within a defined logical spaces, such as an organizational grouping of offices/cubicles (e.g. a department or team space), or a subset of rooms not necessarily contiguous or located within a single physical space. In one embodiment, the count data is distributed by the remote server 20 via an API so as to be accessible from a mobile or other computing device 25. Any given device 10 is typically not aware of any grouping or classification it may belong to, and meaningful grouping of any of devices 10 may be performed by the remote server 10.

The aggregated count data is presented, with low latency (e.g., typically less than a few seconds latency), to a user via an API so as to be accessible via an application, software, or other user interface. The information may be presented to a user interface at various hierarchical slices of virtual spaces. In some embodiments, a user of device 25 may request, from server 20, aggregated count data for a particular virtual space for a defined period of time (e.g., one day, one week, one month) and may receive, in response, an interface displaying a total count for the defined period of time. In some embodiments, the user may obtain from the server trending or hierarchical people count statistics. For example, a user may be able to access a trend of occupancy data over the course of a day on an hourly basis. In one embodiment, the server 20 may have one or more repositories of historical occupancy data collected for one or more devices 10 from which analysis and/or reporting may be done in response to a user request.

Figure 7:
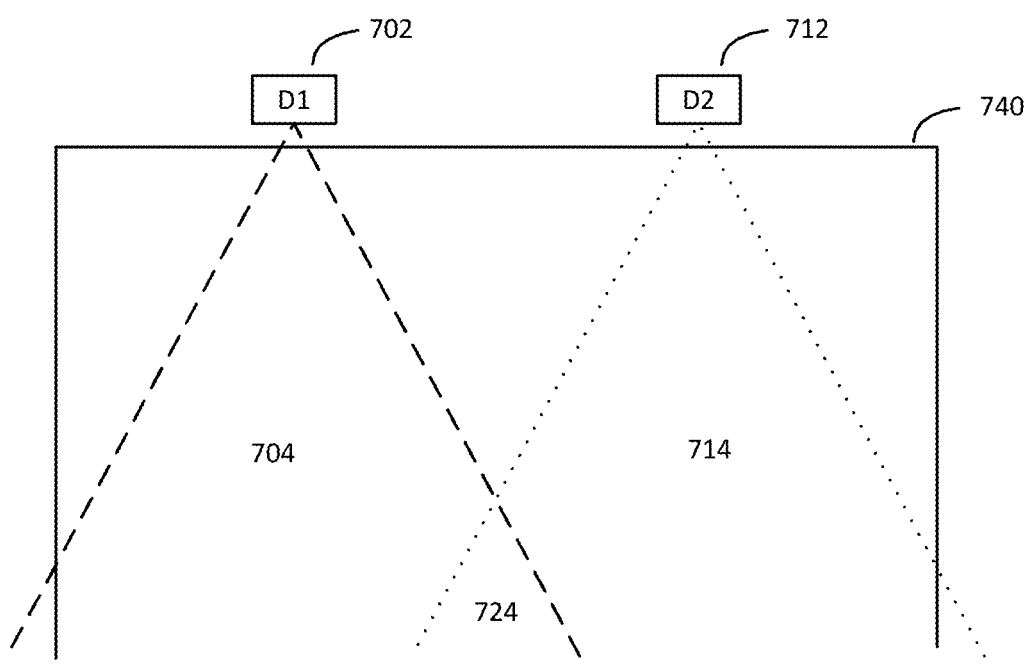
FIG. 7 is a diagram illustrating configuration of multiple depth sensing devices in accordance with some embodiments of the present disclosure.

Another embodiment may exist where a plurality of depth sensing devices 10 are used to monitor a single doorway. This may be particularity beneficial in spaces where a doorway is non-standard in size, where the door is wide (as one example, a warehouse or factory with doorways built for machinery), where multiple actual doors make up a single "entrance" (as one example, a department store), or other scenarios where doorways may have varying or non-standard widths. An example of an exemplary such multi-point device installation is illustrated in FIG. 7. More specifically, a singular device 10 has a limited field of view over which it can capture data, as discussed above with reference to FIGS. 3A-3E. Where a doorway or entryway 740 is unusually large, or simply larger than can be accurately monitored by a single device 10, multiple devices 10 can be deployed at different positions along the threshold of the doorway, each device having its own field of view. FIG. 7 illustrates two devices 702 and 712 (labelled D1 and D2, respectively), however, such is merely exemplary and any non-zero number of devices may be used in different embodiments.

In an exemplary multi-point installation, devices 702 and 712 are positioned in a configuration where their field of views partially overlap, to any desired amount of overlap. Device 702 has a field of view 704, and device 712 has a field of view 714, where the two fields of view meet at an overlap region 724 that is monitored by both devices. While embodiments may exist where the fields of view do not overlap, such an embodiment may suffer from a "blind spot" in monitoring, where a person may ingress or egress into or out of a space without being captured. By configuring the devices with an overlap region 724, blind spots can be avoided and each ingress or egress can be captured.

Because both of devices 702 and 712 generate count data relating to overlap region 724, it is possible that if a person passes through that region, crossing the threshold of the doorway, both devices 702 and 712 may respectively count that ingress or egress as a separate movement, resulted in a duplicated measurement (that is, a false positive). In an exemplary embodiment, this is resolved at the remote server 20. In particular, remote server 20 may receive a series of count data in association with an identified device 702, 712 (identified for instance by a device ID, sensor ID, network ID, MAC address, etc.), along with timestamp data for each count measurement. In some embodiments, the remote server 20 may also receive, for each count measurement, a set of XY coordinates, indicating one or more pixel positions at which the counted person or object was located within the field of view (that is, within the captured image) of the device 10 transmitting the count data. The server 20 may, in an exemplary embodiment, be aware of the installation position of each device and accordingly, may be aware of the relative positions of sensors 702 and 712 monitoring the same doorway. The server 20 may have logic sufficient to compare the count data, timestamp data, and/or XY pixel coordinates provided by each of the sensors 702 and 712 to determine whether ingress/egress was detected in the same direction at the exact same timestamp. Because the timestamp is highly specific (typically a fraction of a second), an overlap in timing may be highly reflective of a duplicated count (the same person counted more than one time). Additionally or alternatively, given known areas of data capture of each of sensors 702 and 712 (known to server 20), an indication that a counted person was sensed in a pixel region corresponding to an area of overlapping monitoring may be highly reflective of a duplicated count. The server 20 may then remove one instance of the duplication (that is, one count, whether positive or negative) from the aggregated count for the doorway, room, virtual space, etc. In some embodiments, server 20 may use other data, such as historical occupancy data for the space, time of day data, hours of operation data, and other appropriate data specific to the relevant doorway 740, room, or larger space to determine a likelihood (e.g., a percentage) that the overlapping timestamps indicate a duplicated count, as compared to an ingress/egress of several people. Where the likelihood of duplication is above a certain threshold or minimum value, the logic of the server 20 may determine that the count is duplicative.

In the exemplary embodiment, the determination of duplication is performed at the server 20, which implementation allows for minimal reconfiguration or unique configuration of the different devices 704, 714. Accordingly, devices 704, 714 may be moved or repositioned without having to be extensively reconfigured. However, embodiments may exist where duplicative count information is culled by the depth sensing devices themselves. For instance, in an alternative embodiment, a depth sensor 230 of only one of device 704 and 714 may be configured to crop out or filter captured data within a proscribed area of overlap region 724, such that only the other device processes the data collected for region 724. Such an embodiment may be beneficial where computing resources are limited or processing speed is paramount, as less image data is required to be processed.

In one embodiment, the remote server 20 contains logic to compare the count data to badge data (RFID) or the like, typically provided by a third party source, to identify whether there is any "tailgating" or "piggybacking," that is, where multiple people enter a secured location by moving closely together although only one authorized person has badged or scanned in. For instance, where people entering a space are required to scan a ticket or badge using, e.g., RFID technology, a total number of badge scans (collected from an external system) may be compared to a total count data within a given period of time to determine if any discrepancies exist. If so, the particular badge/ticket data can be referenced to identify potential security issues.

As an example, for a given time interval, the remote server 20 may determine the number of people that entered a room (or other area) through a doorway based on data from the device 10 used to monitor the doorway. The remote server 20 may also receive data from a security system indicating the number of people that were authorized by the security system to enter the room through the same doorway (e.g., a number of authorized badge scans). If more people entered the room through the doorway than were authorized by the security system, the remote server 20 may detect a "tailgating" event and may log the event and/or provide an output (e.g., a warning or report) indicating an occurrence of the event. For example, the remote server 20 may transmit a warning message to a user at or near the doorway to alert him or her of the detected event. Other types of actions may be taken in response to a detection of "tailgating" event in other embodiments.

Remote server 20 may in some embodiments communicate bi-directionally with one or more devices 10. For instance, remote server 20 may receive periodic updates from a device 10 with status information, such as a MAC address (or other network information) or other information regarding the devices' health and connectivity. The remote server 20 may respond thereto, and may also be capable of querying a device 10 as to that same type of data, or providing operational instructions such as, e.g., instructions to reboot, to update its software, or perform network commissioning process (e.g., blink a light or communicate its network information via Bluetooth or wireless communication), or to kick off/stop data capture operation. In some instances, the remote server 20 may, at a predetermined time or upon request of a user 25, instruct the device 10 to reset its count.

As described above, data capture is performed asynchronously, with event data being captured and processed at cyclical or irregular times. For instance, in retail establishments, there may be little or no data captured after closing hours of the business or when the doors are locked. As a result, there may be predictable times of day at which time the computing capabilities of the device 10 are expected to be unused or underutilized. In this regard, application processor 242 and AI processor 244 may only have processing tasks to perform when event data is being captured by the sensor 232. Accordingly, in one embodiment, spare computing resources of the device 10 are identified, and during periods of relative inactivity, the spare computing resources are used for tasks unrelated to the capture and processing of depth data. For example, the spare computing resources of application processor 242 and AI processor 244 may be used as additional compute for training of the machine learning elements of the AI processor 244, or the update of related algorithms and/or software/firmware. Additionally, spare resources may be used for wholly unrelated tasks to serve the needs of other devices connected to the wireless network. In support of these functions, cached data may be stored, for example, in either or both of memories 246 and 248. By these means, devices 10, all of which are network-enabled, may be taken together or separately to act as a data center. This may reduce bandwidth and latency requirements for other devices, and may improve security where data processing performed by devices other than the depth sensing devices 10 should be restricted to a premise on which device 10 is located.

In another embodiment, the device may be used in an audit mode so that the uncategorized phase data received from the CMOS can be analyzed, without being classified or converted to depth data. In some embodiments, this unconverted phase data ("audit data") may be used in quality assurance or testing to ensure accuracy of the occupancy analysis. In such an embodiment, application processor 242 may function to format the phase data, compress and/or encrypt the data, and transmit the data to server 20 without further analysis or processing by the application processor 242 or the AI processor 244.

In some embodiments, in addition to the phase data, the sensor app processor 236 may also transmit telemetry data to the application processor 242, including, e.g., temperature data, CPU/memory/disk status, commands executed, and the like. In some embodiments, the telemetry data is typically sent at periodic intervals (e.g., every 10 seconds), however, in other embodiments, it may be sent only upon request from the server 20, or with every instance of data capture. In some embodiments, the telemetry data may include data collected from an accelerometer 1080 (FIG. 6) and may be used to detect door slams, earthquake detection, or other ambient movement within the space. Such data may be useful, for example, in implementations where a business or facility owner would like to monitor and manage the structural integrity of a building, or to control stress or strain to the building components. In some instances, the business may wish to track door slams as a means of security monitoring, where a door slam may indicate a fast or unexpected entry or exit. In some embodiments the telemetry data may include data from a decibel sensor 1082 (FIG. 6) and may be used to determine a volume level within a room. Such data may be useful, for example, in controlled environments such as schools, libraries, churches, restaurants, or other establishments where the business or facility owner may have an interest in maintaining a low ambient volume, and/or a customer may be interested in finding a venue with a relatively low or high ambient volume. In one embodiment, decibel sensor 1082 may be understood to provide a single measurement of a decibel level at a particular instance without recording sounds (e.g., conversation) generally. As in the case of audit data, this data may not be processed by the application processor 242 and/or the AI processor 244 in the same manner as event data, but rather, may be forwarded to the server 20 via the communications interface 256. In some instances, the application processor may perform some level of compression, encryption, or other minimal processing on telemetry or status data, in order to facilitate transmission via the communications interface 256.

By means of the methods and systems described above, a real-time, accurate, and highly-scalable solution for people counting can be implemented, while still remaining conscious of privacy and retaining anonymity of the people it monitors. Unlike optical cameras that collect images that must later be processed and/or anonymized, the systems and methods herein are anonymized from the start, as they do not store personally-identifiable information. The depth sensing device does not "track" people or objects within its field of view, but rather, ephemerally measures their movement, using this movement data to recognize and count the number of people traversing the doorway in either direction. Put another way, the device conceptualizes data with respect to a threshold (e.g., of a doorway) and not of the space surrounding or irrelevant to the threshold. The device gathers its count data anonymously, meaning the device has no way to determine the identity, gender, facial features, or other recognizable information of individual people. Through this generated people count data, an accurate, anonymous count of people can be provided to be accessible via a cloud-based interface. Businesses and customers may have access to real-time, historical, and/or predictive count data, and may optimize their management and schedules in view of that data. Further, the data can be viewed at different levels of granularity, providing for highly-flexible analysis thereof.

The foregoing is merely illustrative of the principles of this disclosure and various modifications may be made by those skilled in the art without departing from the scope of this disclosure. The above described embodiments are presented for purposes of illustration and not of limitation. The present disclosure also can take many forms other than those explicitly described herein. Accordingly, it is emphasized that this disclosure is not limited to the explicitly disclosed methods, systems, and apparatuses, but is intended to include variations to and modifications thereof, which are within the spirit of the following claims.

As a further example, variations of apparatus or process parameters (e.g., dimensions, configurations, components, process step order, etc.) may be made to further optimize the provided structures, devices and methods, as shown and described herein. In any event, the structures and devices, as well as the associated methods, described herein have many applications. Therefore, the disclosed subject matter should not be limited to any single embodiment described herein, but rather should be construed in breadth and scope in accordance with the appended claims.

What is claimed is:

1. A system comprising:
   a first depth sensing device configured to monitor a first area, the first depth sensing device comprising:
      a light source for illuminating the first area,
      a sensor for measuring data regarding a phase shift in modulated light from the light source to a detected object,
      a first module for converting the data regarding the phase shift into event data for the detected object,
      a second module for (a) determining, from the event data, whether the detected object is a human, (b) in a case that the detected object is determined to be a human, determining a movement pattern of the human, and (c) in a case that the movement pattern indicates that the human has crossed a predetermined threshold within the first area, generating incremental count data based on the movement pattern; and
   a server remote from the first depth sensing device, wherein the server is communicatively coupled to the first depth sensing device via a network, the server being configured to receive the generated incremental count data from the first depth sensing device.

2. The system of claim 1, wherein neither of the event data nor the generated incremental count data comprises personally-identifiable data for identifying the detected human.

3. The system of claim 1, wherein the first sensing device comprises an accelerometer.

4. A system comprising:
   a first sensing device configured to monitor a first area, the first sensing device comprising:
      a sensor for capturing data regarding a detected object,
      a first module for converting the captured data into event data for the detected object, a second module for (a) determining, from the event data, whether the detected object is a human, (b) in a case that the detected object is determined to be a human, determining a movement pattern of the human, and (c) in a case that the movement pattern indicates that the human has crossed a predetermined threshold within the first area, generating incremental count data based on the movement pattern;

a second sensing device for monitoring a second area that is different from the first area; and a server remote from the first sensing device, wherein the server is communicatively coupled to the first sensing device via a network, the server being configured to receive the generated incremental count data from the first sensing device, wherein the received generated incremental count data from the first sensing device is first count data, wherein the server is configured to:
  receive second count data from the second sensing device,
  determine, based on the first count data and the second count data, an aggregated count value,
  receive, from a user device remote from the server, a request for the aggregated count value, and
  transmit the aggregated count value to the user device, in response to the request.

5. The system of claim 4, wherein the aggregated count value indicates a total number of humans located within a geographic area.

6. The system of claim 5, wherein the geographic area is a room with two doorways.

7. A system comprising:
a first sensing device configured to monitor a first area, the first sensing device comprising:
  a sensor for capturing data regarding a detected object,
  a first module for converting the captured data into event data for the detected object,
  a second module for (a) determining, from the event data, whether the detected object is a human, (b) in a case that the detected object is determined to be a human, determining a movement pattern of the human, and (c) in a case that the movement pattern indicates that the human has crossed a predetermined threshold within the first area, generating incremental count data based on the movement pattern; and
a server remote from the first sensing device, wherein the server is communicatively coupled to the first sensing device via a network, the server being configured to receive the generated incremental count data from the first sensing device, wherein the generated incremental count data from the first sensing device comprises a string of one or more binary values, each binary value respectively indicating whether a human has entered or exited the first area.

8. A system comprising:
a first sensing device configured to monitor a first area, the first sensing device comprising:
  a sensor for capturing data regarding a detected object,
  a first module for converting the captured data into event data for the detected object,
  a second module for (a) determining, from the event data, whether the detected object is a human, (b) in a case that the detected object is determined to be a human, determining a movement pattern of the human, and (c) in a case that the movement pattern indicates that the human has crossed a predetermined threshold within the first area, generating incremental count data based on the movement pattern; and
a server remote from the first sensing device, wherein the server is communicatively coupled to the first sensing device via a network, the server being configured to receive the generated incremental count data from the first sensing device, wherein the event data is not transmitted from the first sensing device to the server.

9. A system comprising:
a first sensing device configured to monitor a first area, the first sensing device comprising:
  a sensor for capturing data regarding a detected object,
  a first module for converting the captured data into event data for the detected object,
  a second module for (a) determining, from the event data, whether the detected object is a human, (b) in a case that the detected object is determined to be a human, determining a movement pattern of the human, and (c) in a case that the movement pattern indicates that the human has crossed a predetermined threshold within the first area, generating incremental count data based on the movement pattern; and
a second sensing device for monitoring a second area that partially overlaps with the first area;
a server remote from the first sensing device, wherein the server is communicatively coupled to the first sensing device via a network, the server being configured to receive the generated incremental count data from the first sensing device, wherein the received generated incremental count data from the first sensing device is first count data, and wherein the first count data comprises first timestamp data, wherein the server is configured to:
  receive second count data from the second sensing device, the second count data comprising second timestamp data,
  determine, based on the first count data and the second count data, an aggregated count value,
  determine, based on the first timestamp data and the second timestamp data, a modified aggregated count value,
  receive, from a user device remote from the server, a request for an aggregated count value, and
  transmit the modified aggregated count value to the user device, in response to the request.

10. A system comprising:
a first sensing device configured to monitor a first area, the first sensing device comprising:
  a sensor for capturing data regarding a detected object,
  a first module for converting the captured data into event data for the detected object,
  a second module for (a) determining, from the event data, whether the detected object is a human, (b) in a case that the detected object is determined to be a human, determining a movement pattern of the human, and (c) in a case that the movement pattern indicates that the human has crossed a predetermined threshold within the first area, generating incremental count data based on the movement pattern, wherein the predetermined threshold within the first area is a two-dimensional area, and wherein it is determined that the human has crossed the predetermined threshold where the movement pattern indicates that human has passed through the two-dimensional area; and a server remote from the first sensing device, wherein the server is communicatively coupled to the first sensing device via a network, the server being configured to receive the generated incremental count data from the first sensing device.

11. A system comprising:
a first sensing device configured to monitor a first area, the first sensing device comprising:
  a sensor for capturing data regarding a detected object,
  a first module for converting the captured data into event data for the detected object,
  a second module for (a) determining, from the event data, whether the detected object is a human, (b) in a case that the detected object is determined to be a human, determining a movement pattern of the human, and (c) in a case that the movement pattern indicates that the human has crossed a predetermined threshold within the first area, generating incremental count data based on the movement pattern, wherein the predetermined threshold within the first area has a parabolic or partially parabolic shape; and
a server remote from the first sensing device, wherein the server is communicatively coupled to the first sensing device via a network, the server being configured to receive the generated incremental count data from the first sensing device.

12. A device comprising:
a light source for illuminating a first area,
a sensor for measuring data regarding a phase shift in modulated light from the light source to an object within the first area,
a first module for converting data regarding the phase shift into depth data,
a second module for (a) classifying the object based on the depth data, (b) determining whether the object has crossed a predetermined threshold within the first area, (c) transmitting a binary value to a remote server after it is determined that the object has crossed the predetermined threshold.

13. The device of claim 12, wherein the device is positioned above a doorway, and
wherein the predetermined threshold is the doorway.

14. A method comprising:
receiving, at a server from at least one sensing device, first count data regarding occupancy of a first physical space, second count data regarding occupancy of second physical space, and third count data regarding occupancy of a third physical space;
defining, by the server, a first virtual space encompassing at least the first physical space and the second physical space;
defining, by the server, a second virtual space encompassing at least the first physical space, the second physical space, and the third physical space;
determining, by the server, based on an aggregation of the first count data and the second count data, a total occupancy value of the first virtual space;
determining, by the server, based on an aggregation of the first count data, the second count data, and the third count data, a total occupancy value of the second virtual space; and
providing by the server, an interface through which a remote device may access one or more of the total occupancy value of the first virtual space and the total occupancy value of the second virtual space.

15. The method of claim 14, wherein the first virtual space is a room,
wherein the first count data reflects movement through a first entry/exit point to the room, and
wherein the second count data reflects movement through a second entry/exit point to the room.

16. The method of claim 14, wherein the first virtual space is a first room, and the second virtual space is a second room different from the first room.

17. The method of claim 14, further comprising:
associating the total occupancy value of the first virtual space and the total occupancy value of the second virtual space with a timestamp; and
providing, via the interface, an association between the timestamp and one or more of the total occupancy value of the first virtual space and the total occupancy value of the second virtual space.

18. The method of claim 14, wherein the receiving is performed in response to a query received via the interface.

19. The method of claim 14, further comprising:
calculating, based on the total occupancy value of the first virtual space, a congestion value of the first virtual space; and
in response to a request from the remote server, transmitting, via the interface, the calculated congestion value.

* * * * *